(12) United States Patent
Pike, II

(10) Patent No.: US 9,893,559 B2
(45) Date of Patent: Feb. 13, 2018

(54) PORTABLE POWER STORAGE DEVICE

(71) Applicant: Sunbird Engineering Limited, Lai Chi Kok, Kowloon (HK)

(72) Inventor: William Harold Pike, II, Kowloon (HK)

(73) Assignee: Sunbird Engineering Limited, Kowloon (HK)

( * ) Notice: Subject to any disclaimer, the term of this patent is extended or adjusted under 35 U.S.C. 154(b) by 0 days.

(21) Appl. No.: 14/589,115

(22) Filed: Jan. 5, 2015

(65) Prior Publication Data
US 2016/0197516 A1 Jul. 7, 2016

(51) Int. Cl.
*H02J 7/00* (2006.01)
*H02J 7/35* (2006.01)

(52) U.S. Cl.
CPC ....... *H02J 7/355* (2013.01); *H02J 2007/0062* (2013.01)

(58) Field of Classification Search
USPC ...................................... 320/101
See application file for complete search history.

(56) References Cited

U.S. PATENT DOCUMENTS

| | | | | |
|---|---|---|---|---|
| 6,479,963 B1* | 11/2002 | Manor | ................ | H01M 2/1022 320/110 |
| 8,432,124 B2* | 4/2013 | Foster | ................... | A45C 11/00 320/101 |
| 8,760,108 B2* | 6/2014 | Scarmozzino | ........... | A45C 5/02 136/244 |
| 2006/0022635 A1* | 2/2006 | Li | ........................ | H02J 7/022 320/107 |
| 2007/0201201 A1* | 8/2007 | Daley, III | ............ | G06F 1/1628 361/679.27 |
| 2009/0102415 A1* | 4/2009 | Muchow | ................ | F03D 9/002 320/101 |

\* cited by examiner

*Primary Examiner* — Yalkew Fantu
(74) *Attorney, Agent, or Firm* — Renner Kenner Greive Bobak Taylor & Weber

(57) ABSTRACT

An electronic device includes a housing having at least one solar panel arranged to generate electrical energy for delivery to a battery within the housing, wherein the at least one solar panel is foldable about the housing.

14 Claims, 3 Drawing Sheets

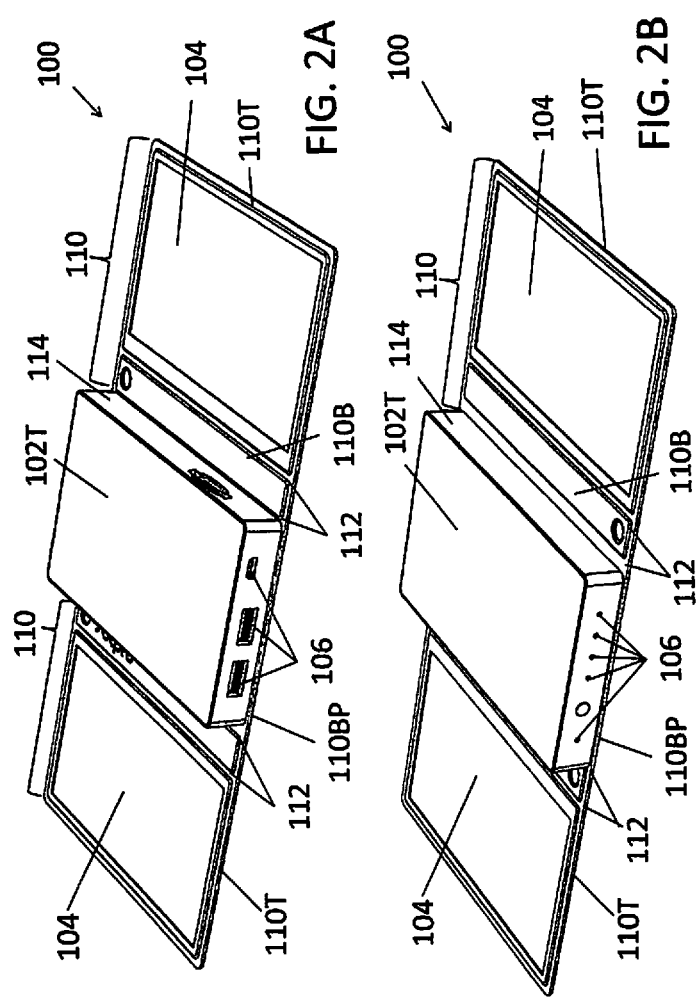

9,893,559 B2

PORTABLE POWER STORAGE DEVICE

TECHNICAL FIELD

The present invention relates to an electronic device, and particularly, although not exclusively, to a solar powered power storage device.

BACKGROUND

With smart phones and portable computers becoming more popular, there is a desire for users of these portable computers to continue to see improvements to portability and performance.

However, one difficulty encountered by designers of these portable computers and other electronic devices is that the battery capacity remains a big hurdle to building a desirable device. Although battery technology is improving, the innovations in battery technology are not moving at the same pace as the increase in power consumption of these portable devices. As a result, users are relying on portable power banks to keep their devices powered.

These portable power banks are helpful in that they can provide a fairly high level of extra battery capacity for users of portable electronic devices. Often, once a user finds his or her device running out of charge, the extra battery can be used to recharge the device without the need of a mains power supply. However, despite their higher capacity, these portable power banks nevertheless suffer from the same problems as the smart phones and portable computers they are designed to power, that is, eventually, these portable battery banks will require a mains power socket or car power socket to recharge its battery. Thus such devices will not be useful for any significant lengths of time if users intend on being away from a mains socket for a long time (e.g. on an outdoor trek that last for days)

SUMMARY OF THE INVENTION

In accordance with a first aspect of the present invention, there is provided an electronic device comprising: a housing having at least one solar panel arranged to generate electrical energy for delivery to a battery within the housing, wherein the at least one solar panel is foldable about the housing.

In an embodiment of the first aspect, wherein the at least one solar panel is arranged to be supported on a first flap engaged to the housing.

In an embodiment of the first aspect, the first flap is hinged to the housing such that the flap can be folded about the housing to expose the at least one solar panel.

In an embodiment of the first aspect, the housing includes a second solar panel disposed on a second flap hinged to the housing.

In an embodiment of the first aspect, the second flap is hinged on the housing opposite to the first flap.

In an embodiment of the first aspect, the second flap is arranged to be folded about the housing to expose the second solar panel.

In an embodiment of the first aspect, the second flap is arranged to be folded onto the first flap.

In an embodiment of the first aspect, the first and second flap is arranged to be electrically connected to the battery via an electrically conductive hinge.

In an embodiment of the first aspect, the electrically conductive hinge is a flexible printed circuit board.

In an embodiment of the first aspect, the first and second flap includes a plurality of magnetic members arranged to engage the first and second flap when the second flap is folded on the first flap.

In an embodiment of the first aspect, the magnetic members are disposed adjacent to an edge of the first and second flap.

In an embodiment of the first aspect, the housing has a supplementary solar panel disposed on the housing.

In an embodiment of the first aspect, the supplementary solar panel is directly connected to the battery.

In accordance with a second aspect of the present invention, there is provided a method for operating an electronic device in accordance with the first aspect, comprising the steps of:

unfolding a first flap member away from a second flap member to expose a first solar panel on the first flap member; and unfolding the second flap member away from the housing to expose a second solar panel on the second flap member.

BRIEF DESCRIPTION OF THE DRAWINGS

Embodiments of the present invention will now be described, by way of example, with reference to the accompanying drawings in which:

FIG. 2A is a front perspective view of the power storage device of FIG. 1A wherein the solar panels of the power storage device are in an opened position in accordance;

FIG. 2B is a rear perspective view of the power storage device of FIG. 1A wherein the solar panels of the power storage device are in an opened position in accordance; and, FIG. 3 is a front perspective view of the power storage device of FIG. 1A with its solar panels in between an open and closed position.

DETAILED DESCRIPTION OF THE PREFERRED EMBODIMENT

Figures 1A, 1B:
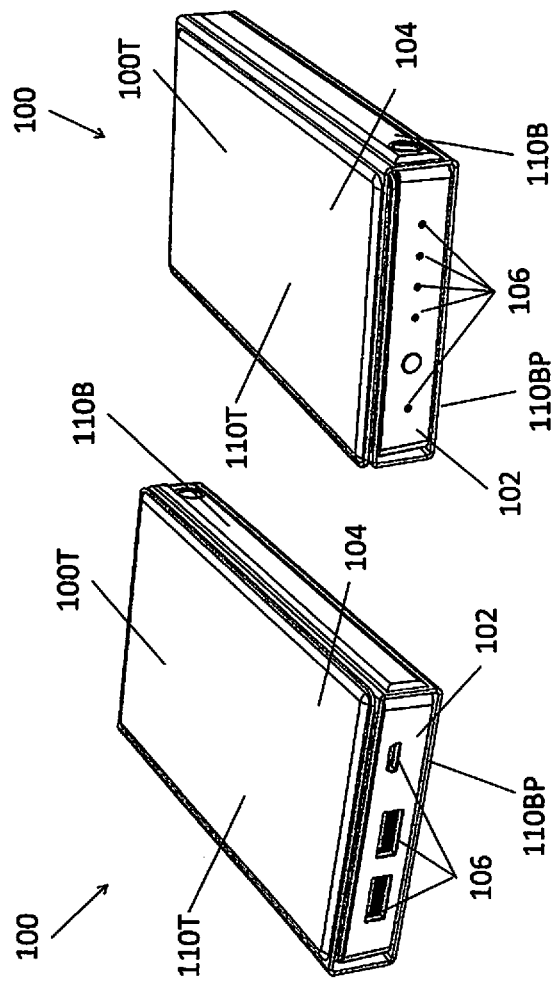
FIG. 1A is a front perspective view of a power storage device in accordance with one embodiment of the present invention wherein the solar panels of the power storage device are in a closed position in accordance.
FIG. 1B is a rear perspective view of a power storage device in accordance with one embodiment of the present invention wherein the solar panels of the power storage device are in a closed position in accordance.

With reference to FIG. 1, there is provided an example embodiment of an electronic device 100 comprising: a housing 102 having at least one solar panel 104 arranged to generate electrical energy for delivery to a battery within the housing 102, wherein the at least one solar panel 104 is foldable about the housing 102.

In this embodiment, the electronic device 100 is a portable power storage device which includes a battery or power storage module arranged to store electrical energy for use by a user. Preferably, this energy can be discharged through one or more electrical ports such as USB ports 106, although other ports such as wireless charging/discharging ports are also possible. An electrical port may also be implemented such that electrical energy from another source, such as a mains power supply, can be used to recharge the battery within the power storage module 100.

As shown in this example embodiment, the battery may be housed within a housing 102 arranged to support and protect the battery and any electronic control circuits found within the housing 102 so as to control and regulate the charging and discharge of the battery. The housing 102 may be a box like container having a hollow chamber arranged to carry or substantial surround the battery whilst having a plurality of indicators or lights 108 to indicate the status of the battery, including capacity, charge status or other electrical characteristics or useful information. The housing may also be made from plastic or metal and is preferably hard so as to protect the battery within from everyday exposure to external pressures caused from normal usage.

In this example embodiment, the housing 102 has at least one solar panel 104 which is in electrical connection with the battery so as to charge the battery. As shown in FIGS. 1A to 3, the solar panels 104 are disposed on a corresponding flap member 110 which is engaged to the housing 102 by a hinge 112 such that each of the flap members 110 can be folded about the housing 102 so as to operate between a closed position as shown in FIG. 1 and an open position in FIG. 3. The flap members 110 may be made from leather or plastic or any other suitable material and may be sufficiently hard or sturdy to support a solar panel 104 disposed thereon.

As shown in FIG. 1, the portable power storage device 100 is shown to have its solar panels 104 in a "closed" position. In this position, the solar panels 104 which are disposed on each of the flap members 110 are arranged to be folded so as to cover a top portion 102T of the housing. As shown, a first and second flap member 110 each has a binding portion 110B in between two hinges so as to allow the binding portion 110B to be folded so as to encompass the sidewalls 114 of the power storage device. Adjacent to this binding portion 110B is also a hinge 112 which is arranged to allow the top portion 110T of the flap 110 to turn about a top edge of the portable power storage device 100 such that the top portion 110T of the flap can rest on top 100T of the portable power storage device.

In this embodiment, as the solar panel 104 is disposed on a surface of the top portion 110T of the flap 110, once the top portion 110T is folded to rest on top of the portable power storage device 100T, the solar panel 104 will be wrapped around the top of the portable power storage device 100. Since solar panels 104 are more likely to have delicate surfaces, by wrapping the solar panel 104 to the top of the power storage device 100T, the solar panels 104 are protected from external forces such as bumps or scrapes which may be applied onto the power storage device during everyday usage.

Once the top portion 110T of the flap member 110 is folded around the power storage device 100, the flap member 110 may use a plurality of magnets (not shown) around the edges of the flap member to magnetically attract the flap member into the "closed" position. In turn, by including magnetic members, the flap members may be more securely engaged to the power storage device when in the closed position and has the effect that the flap members may not unfold itself inadvertently whilst in storage or transport. In examples where the housing is made from a non-magnetically attracting material such as plastic or aluminium, magnetic structures can be placed around the housing so as to establish this magnetically attraction.

Preferably, one of the flap members 110 may have a slightly longer binding portion 110B, extended hinge 112 or both such that the flap member 110 is sized to wrap around the power storage device 100 and the first flap member 110 which has already been wrapped around the housing 102 of the power storage device 100. As the power storage device 100 becomes taller or thicker once the first flap member 110 is wrapped around the housing 102, the extended hinge 112 or slightly longer binding portion 110B will allow a superior fit in the closed position.

Figure 3:
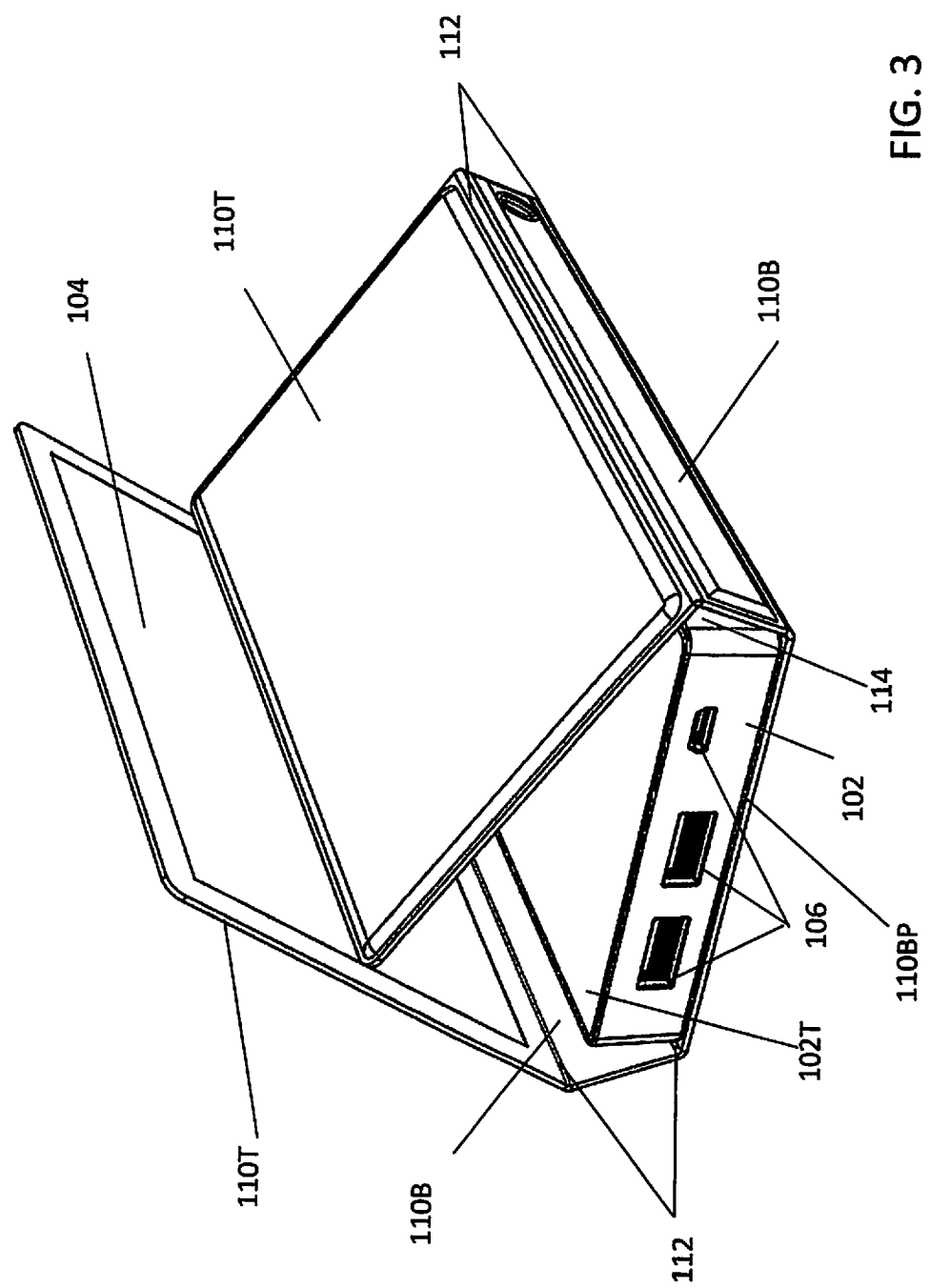

Once a user desires to expose the solar panels 104 so as to generate electrical power from light, the user can open each of the flap members 110 by unwrapping each flap member 110 from the power storage device 100. This can be completed by lifting each flap member 110 away from the power storage device 100 as shown in FIG. 3, and extending each flap member 110 from the power storage device 100 so as to expose the solar panels 104 on each of the flap member 110 upwardly to maximize the light exposure of each solar panel 104.

Once the flap members 110 are unwrapped into an "open" position as shown in FIG. 2, the solar panels 104 on each flap member 110 is arranged to generate electrical power and in turn, deliver this electrical power through a flexible conduit (not shown) such as a flexible printed circuit board to the battery of the power storage device 100 so as to charge the battery or, if desired by a user, directly deliver the electrical power to a port such that the user can use the electrical energy through the port. Preferably, a control circuit can be implemented within the housing 102 such that the electrical energy can be switched from the solar panel 104 to the battery, to the port or to both as desired by a user. In advanced embodiments, the control circuit may detected the electrical characteristics of the battery or a device which is connected to the port and determine how to best allocate the electrical energy based on demand of the battery and any connected device.

In some example embodiments, the flap members 110 may be formed from a single planar sheet of leather, plastic or any other suitable material. The sheet may be formed from a layer of suitable material so as to provide a pocket of space within for disposing of any electrical conduits or printed circuit boards to connect the battery within the housing, through the housing through one or more apertures and to the solar panels. A back plate portion 110BP may also be formed in between the first and second flap members 110 which is arranged to be support the power storage device.

In yet another embodiment, the top 102T of the housing 102 of the portable storage device 100 may also include a solar panel in which case the surface area of the solar panels for the device is further enlarged, which in turn increases the amount of electrical energy generated.

The above embodiments may be advantageous in that solar panels may be used to generate a sufficiently useful charge so as to recharge the power storage device, yet by having a folding arrangement to retract the solar panels, allows the power storage device to remain portable.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A portable power bank comprising:
   a box-like housing;
   a battery and associated electric control circuit arranged in the housing;
   one or more electrical ports arranged on the housing for electrically connecting with the battery, each adapted for at least one of:

connection with an external power source for charging the battery, and connection with an external electronic device for powering the external electronic device;

a first flap member connected to the housing through a first hinge; and at least one first solar panel arranged on the first flap member and electrically connected with the battery such that, when exposed to the external environment, electrical energy can be generated for delivery to the battery;

wherein the first flap member is movable between an open position in which the at least one first solar panel is exposed to the external environment and a closed position in which the at least one first solar panel is concealed from the external environment.

2. The portable power bank in accordance with claim 1, further comprising:

a second flap member connected to the housing through a second hinge;

at least one second solar panel arranged on the second flap member and electrically connected with the battery such that, when exposed to the external environment, electrical energy can be generated for delivery to the battery;

wherein the second flap member is movable between an open position in which the at least one second solar panel is exposed to the external environment and a closed position in which the at least one second solar panel is concealed from the external environment.

3. The portable power bank in accordance with claim 2, wherein the first hinge is arranged on a first side of the housing and the second hinge is arranged on a second side of the housing opposite the first side.

4. The portable power bank in accordance with claim 2, wherein the second flap member and the first flap member contact each other when both are in their respective closed position.

5. The portable power bank in accordance with claim 2, wherein the first flap member and the second flap member each includes one or more magnetic members for securely engaging with each other when both are in the respective closed positions.

6. The portable power bank in accordance with claim 5, wherein the one or more magnetic members are respectively disposed on an edge of the first flap member and on an edge of the second flap member.

7. The portable power bank in accordance with claim 1, further comprising a supplementary solar panel that is disposed on a surface of the housing and electrically connected with the battery.

8. The portable power bank in accordance with claim 7, wherein the supplementary solar panel is concealed from the external environment when the first flap member is in the closed position.

9. The portable power bank in accordance with claim 1, wherein the housing further comprises indicators for indicating the status of the battery.

10. The portable power bank in accordance with claim 1, wherein the associated electric control circuit is arranged to detect electrical characteristics of the external power source or the external electronic device connected to the one or more electrical ports.

11. The portable power bank in accordance with claim 1, wherein the first hinge is part of the first flap member.

12. The portable power bank in accordance with claim 2, wherein the second hinge is part of the second flap member.

13. The portable power bank in accordance with claim 1, wherein the housing comprises a back plate portion connected with the first flap member.

14. The portable power bank in accordance with claim 2, wherein the housing comprises a back plate portion connected with both the first flap member and the second flap member.

* * * * *